United States Patent [19]

Chen et al.

[11] 3,863,033

[45] Jan. 28, 1975

[54] STEP-BY-STEP TELEPHONE CENTRAL EXCHANGES FOR USE WITH PCM COMMUNICATION NETWORKS

[75] Inventors: Chungmin Chen, Elmhurst; Michael J. Kelly, Melrose Park; Bernard J. Rekiere, Addison, all of Ill.

[73] Assignee: GTE Automatic Electric Laboratories Incorporated, Northlake, Ill.

[22] Filed: Apr. 30, 1973

[21] Appl. No.: 356,003

[52] U.S. Cl. ..... 179/18 FC, 179/15 AQ, 179/15 AT

[51] Int. Cl. .................... H04j 3/00

[58] Field of Search ....... 179/15 AT, 18 FC, 18 FH, 179/24, 26, 15 AQ, 18 J

[56] References Cited

UNITED STATES PATENTS

| | | | |
|---|---|---|---|
| 2,829,204 | 4/1958 | Dimono | 179/26 |
| 2,863,950 | 12/1958 | Dunning | 179/18 FC |
| 3,087,019 | 4/1963 | Faulkner | 179/18 FH |
| 3,458,659 | 7/1969 | Sternung | 179/15 AQ |
| 3,496,301 | 2/1970 | Kaengl | 179/15 AT |
| 3,585,306 | 6/1971 | Battocletti | 179/15 AT |
| 3,778,555 | 12/1973 | Nordling | 179/18 FC |

*Primary Examiner*—David L. Stewart

[57] ABSTRACT

A conventional step-by-step telephone central exchange having line finder, selector and connector switches is modified for use with a PCM TDM communication switching system through elimination of the selector switches and through direct connection of selected numbers of line finder switches and connector switches to the originating channel units and terminating channel units, respectively, of a standard PCM channel bank assembly.

4 Claims, 3 Drawing Figures

STEP-BY-STEP TELEPHONE CENTRAL EXCHANGES FOR USE WITH PCM COMMUNICATION NETWORKS

This invention relates to equipment and service improvements for telephones central exchanges, and more particularly, relates to an improved step-by-step central exchange for use with a PCM TDM communication switching system.

It is estimated that at least one-half of the telephone subscribers of metropolitan areas and a majority of the subscribers of rural areas are served by direct control step-by-step telephone central exchanges. As the communication needs of the subscribers have become increasingly more complex and demanding, the direct control dialing and electromechanical switching equipment of the step-by-step central exchange can no longer with satisfaction meet the service requirements of the subscriber without implementation of such improved communication techniques as indirect or common control call processing and solid state switching equipment. Further, the capability to employ time divisional multiplex digital data PCM communication systems would provide many well known advances in the arts of call transmission and switching. However, such upgrading of subscriber service within the step-by-step central exchanges would be opposed by such economic factors as the remaining useful life of existing electromechanical call processing and switching equipment and outside plant facilities, the replacement cost of electronic systems, etc. It is herein proposed to modify a direct control step-by-step central exchange in an economical manner so as to enable a step-by-step central office to be linked directly with a PCM switching network and thereby provide new services to linking subscibers.

Step-by-step automatic and machine-switching systems employing the Strowger principle of switching are well-known in the art of telephony. The step-by-step equipment has proven sturdy and reliable and not as sensitive to electrical transients as the solid state electronic devices of electronic switching equipment. On the other hand, the direct control switching of step-by-step equipment does not permit the ready addition of new services as can be accomplished with stored program common control electronic switching equipment. For stored program common control switching systems, it is possible to make available to the subscribers added service features such as abbreviated dialing, call transfer, automatic number identification, three way conference circuits, alternate call routing and others. Faster switching speeds are available and there are lower administrative and maintenance costs involved. Existing step-by-step central exchanges can now be economically linked with a PCM switching system employing stored program common control through the use of T1 carrier trunk lines with minimum modifications to existing step-by-step equipment.

It is therefore an object of the present invention to provide a step-by-step telephone central exchange modified for direct interconnection to PCM terminal equipment. It is another object of the invention to provide new services of a common control PCM switching system to subscribers served by a step-by-step central office without excessive equipment modification. It is a further object to provide a proposed trunking scheme where a number of smaller subscriber line groupings can economically utilize a larger PCM switching system. It is still another object to provide automatic number identification ANI to a step-by-step exchange. Still a further object is to provide re-routing capabilities in instances of blocked calls. Another object of the invention is to provide both dial pulse calling and touch calling conveniences to the subscribers of the step-by-step exchange.

An improved telephone communication exchange for linking subscriber lines with a PCM switching system comprising a first preselected matrix of subscriber line pairs, a first grouping of line finder switches, a corresponding number of originating channel units interconnected with the line finder switches, respectively, PCM channel bank means including outgoing and incoming time multiplexed carrier mediums connected to the PCM switching system, said channel bank means receiving information related signals from the originating channel units for transmission on said carrier medium, a first grouping of connector switches and a corresponding number of terminating channel units interconnecting the connector switches with the channel bank means, said connector switches connected to the first preselected matrix of subscriber line pairs. In particular, a group of 100 subscriber telephone line pairs are served by a line finder switch group each of which steps to both vertical and rotary bank contacts to locate a calling party in a known manner and is interconnected with an associated originating channel unit of an originating channel unit group of a corresponding number. The originating channel unit group is interconnected to a T1 carrier channel bank which provides information to a remote located PCM switch over a time multiplexed PCM carrier line. Information switched through the PCM switch is received on an incoming T1 carrier line, is interfaced through the T1 carrier channel bank and provided to a terminating channel unit group. The terminating channel unit group is interconnected to a connector switch group of a corresponding number to the terminating channel unit group. The connector switch group is connected directly to the 100 subscriber telephone line pairs and operates in a known manner of both vertical and rotary stepping to connect with a called party.

Figure 1:
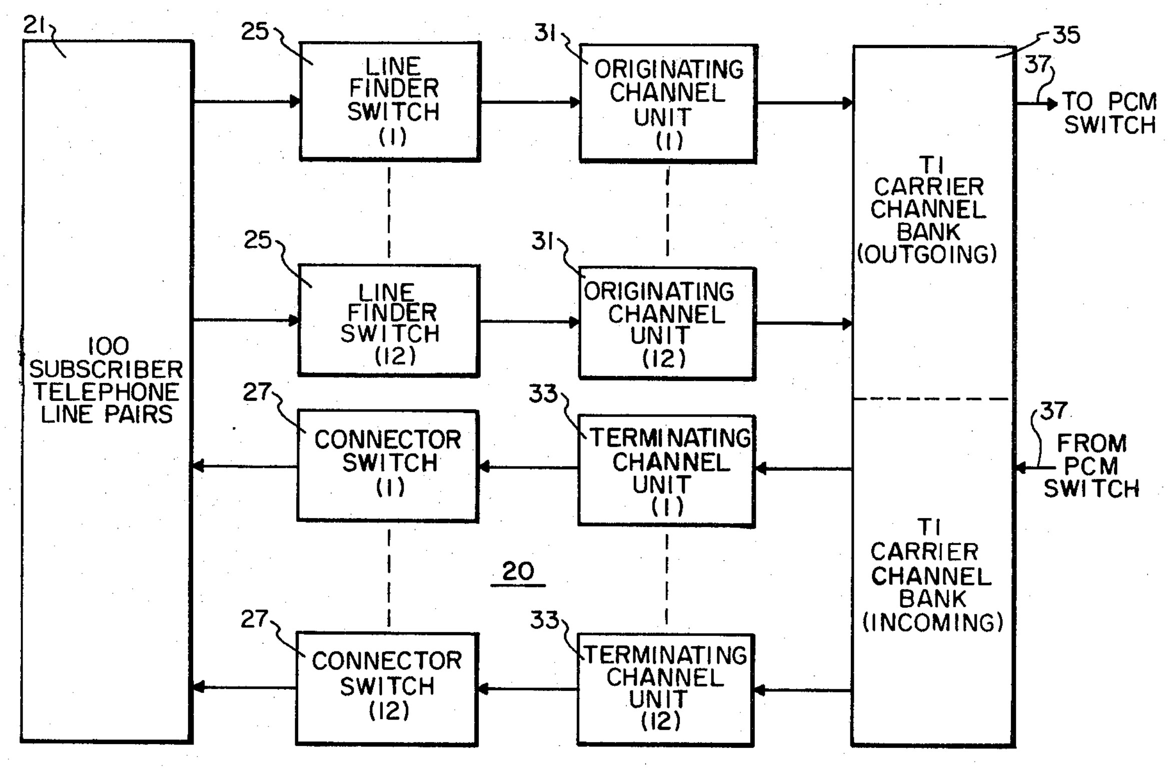
FIG. 1 is a functional block diagram of an improved telephone communication exchange in accordance with the principles of the present invention.

In FIG. 1, there is shown an improved telephone communication exchange 20 having a group of 100 subscriber telephone line pairs 21 served by twelve Strowger-type step-by-step line finder switches 25 and connector switches 27, respectively, twelve PCM originating loop channel units 31 and terminating loop channel units 33, respectively, and an associated T1 carrier channel bank or terminal 35 as would comprise the terminal portion of a Lenkurt 91A pulse code modulated system. As is common practice, the channel bank equipment converts analog information into time division multiplexed pulse code modulated digital pulse data arranged in 24 channels of information within a single time frame suitable for transmission over a T1 carrier transmission line and interconnected with some remote PCM switching station. Since a telephone central exchange can serve as few as 100 subscribers or more than 10,000 subscribers, the communication exchange 20 should be understood to consist of as many groups of 100 subscribers as are needed to connect all subscribers being served. Accordingly, for most central exchanges the equipment of FIG. 1 would be duplicated many times.

Figure 2:
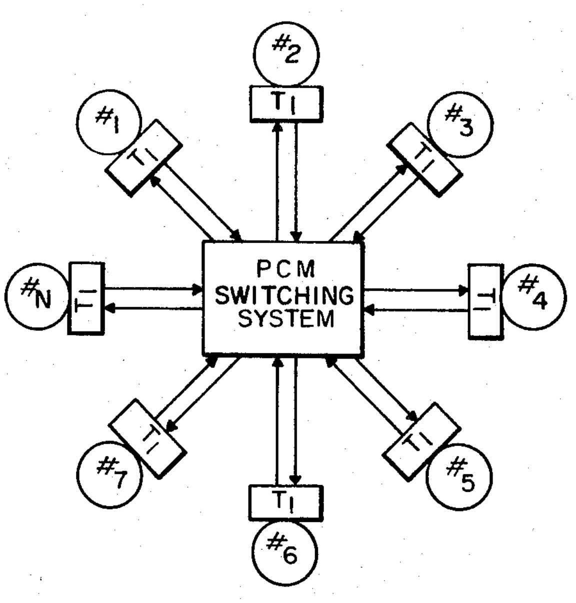
FIG. 2 is a functional block diagram of a number N of the telephone exchanges of FIG. 1 interlinked with a common PCM switching system through T1 channel bank equipment.

In accordance with the invention, the T1 terminal 35 is comprised of outgoing and incoming sections which transmit and receive digital data, respectively, over two pairs of T1 carrier lines 37 to and from a PCM switch, FIG. 2. The T1 terminal 35 is capable of processing 24 separate channels of digital data as might be provided from 24 telephone line pairs. However for the purposes of the present invention, traffic flow considerations of the exchange of FIG. 1 have revealed a small probability of occurrence of there existing more than 12 simultaneously occurring originating calls from any given group of 100 subscriber stations, and likewise for the probability of occurrence of more than 12 simultaneously occurring terminating calls therefrom. Hence, the capacity of the T1 terminal 35 is shown to be allocated for processing 12 originating and 12 terminating calls from each subscriber group of 100 lines. It should be apparent that other allocations of channel bank equipment could have been made had traffic analyses established a call pattern from a particular subscriber group of more originating calls than terminating calls or vice versa. In that case, there would be provided more originating units 31 than terminating units 33 or vice versa. Further, the type of Strowger exchange which is being modified is that which utilizes line finder switches rather than line switches, the principles of the present invention only being applicable to the line finder type switching setup so as to provide automatic number identification capability.

FIG. 2 shows the pictorial representation of a number N of step-by-step telephone central offices or exchanges all adapted through the inclusion of T1 terminal equipment for communication with each other through a central PCM switching system. Of course, some of the modified exchanges may be more distantly located with respect to the PCM switching system than are others but this factor is immaterial. The full advantage of permitting a number of different step-by-step central exchanges to share the large capital investment of a PCM switching station where the number of subscribers of smaller exchanges would not otherwise justify such an expense is aptly illustrated.

In the prior art, a step-by-step central office utilizing line finder switching equipment would include associated selector and connector switches arranged for group selecting, trunk hunting and final connection to the called party, respectively. The connector switch is a two-step operating switch and is the final switch in the switch-train sometimes referred to as a final selector. The operations of these switches are well known and will not be disclosed in great detail herein. It is proposed to modify the step-by-step office by removing all selector switches and connecting the output of each line finder switch 25 directly to an associated originating channel unit 31. The associated originating channel unit 31 is known to convert dc dial pulsing and dc supervision as well as voice signals into dc logic levels in accordance with quantizing theory of converting analog data to digital format suitable for transmission. Further, the associated originating unit 31 is assigned to a single channel time slot of the 24 channel time frame and therefore, a selecting and connecting function for appropriating an idle trunk line in order to establish a call is not necessary once the line finder switch locates and connects to a calling party requesting service.

The connector switches 27 are advantageously employed to select the called party in a given group of 100 subscriber line pairs because of their normal two step vertical and rotary connecting operation. Each connector switch 27 is connected directly with an associated terminating channel unit 33. The terminating channel units 33 are used to convert reverse battery supervision to dc logic levels and to provide the signals correlating to dial pulses for driving the vertical and rotary movements of the connector switches 27 to select the called party. Just as the originating channel units 31 are used to provide outgoing information in twelve originating channels of the T1 carrier trunk, the terminating channel units 33 are used to select incoming information from twelve terminating channels of the T1 carrier trunk, respectively.

The line finder switches 25 act as line concentrators and provide automatic number identification ANI, and the connector switches 27 perform final connection, ringing and battery feed. The calling party talking battery is supplied by the originating units 31 and called party battery is provided by the connector switches 27. The removal of the selector switches of the step-by-step office will not impair the overall grade of service of the central office since the function of the selector switches is performed by the PCM switching system which has a lower call blocking probability. One common configuration for line finder and connector switches is the 200-line configuration wherein there are two contact banks or matrices of 100 contacts, each such contact bank being associated with one of the 100-line groups of subscriber lines. Traffic tables show that 200 lines can have adequate service from fewer than twice the number of line finder switches needed to serve 100 lines; thus, 200-line line finder switches are universally preferred and it is common practice to employ groups of line finder switches selected by group relays to practice preferential hunting techniques.

Line finder equipment shelves are commonly known and a typical line finder shelf would consist of a number of line finder switches, group relays, distributors, line relays, associated line equipment and an equipment frame. Line finder shelves are available in a variety of sizes and shapes depending on the equipment frames, the number of line finders in the shelf, type of line equipment, type of metering, whether restricted service is furnished, etc. Three standard shelf sizes, either 20, 26 or 30 line finder switches per shelf, have been manufactured to meet different traffic situations. Hence, the number of line finder switches which might be made available for a group of 100 subscribers would be either 10,13 or 15, respectively.

Now, dividing the 200-line finder switches into two groups will to some extent degrade the service but use of the PCM switch will compensate for most of the lost grade of service. For example, when considering the worst case where only 20 line finder switches are available for 200 subscriber line pairs, the traffic capacity of 20 trunks under full availability usage is 9.4 Erlang, or 0.047 Erlang per subscriber with the grade of service of 0.001 or 1 blocked call out of 1,000 calls. After dividing the line finder switches, the service grade drops to 0.015 or 15 blocked calls out of 1,000 calls if the average traffic ordered by a subscriber remains the same. Whereas the number of blocked calls of a PCM switch is considered negligible under the average traffic loading of 0.4 Erlang per channel, and the service grade of a selector switch is designed to be generally 0.01 to 1 blocked call out of 100 calls. Hence, the net degrade of service from the elimination of the selector switches is approximately 0.005 or 5 blocked calls out of 1,000 calls which is an acceptable degradation of service for a step-by-step telephone central exchange.

Further; in the configuration proposed for usage as shown in FIG. 1, there would be provided twelve line finder switches for a 100 subscriber line grouping. A group of 12 trunk lines with full availability can carry the traffic of 4.3 Erlang at the grade of service of 0.001. With 12 trunk lines each assigned for originating and terminating functions per 100 subscribers, the average loading per channel is 0.36 Erlang and a single subscriber may offer up to 0.043 Erlang each of originating and terminating traffic. This traffic loading capacity is quite capable of handling the talkative subscribers. The cost of a T1 channel bank is shared by 100 subscribers. The reliability of the system of FIG. 1 can be improved merely by spreading the channels assigned to each 100 subscriber grouping to different T1 trunk lines. For example, a 2,400 line exchange will have 12 originating T1 carrier trunks and 12 terminating T1 carrier trunks. Now, by distributing the information channels that are assigned to a 100 subscriber grouping such that 24 information channel appears on 24 different T1 carrier trunks, respectively, the failure of a single T1 carrier trunk does not degrade the overall service appreciably.

Figure 3:
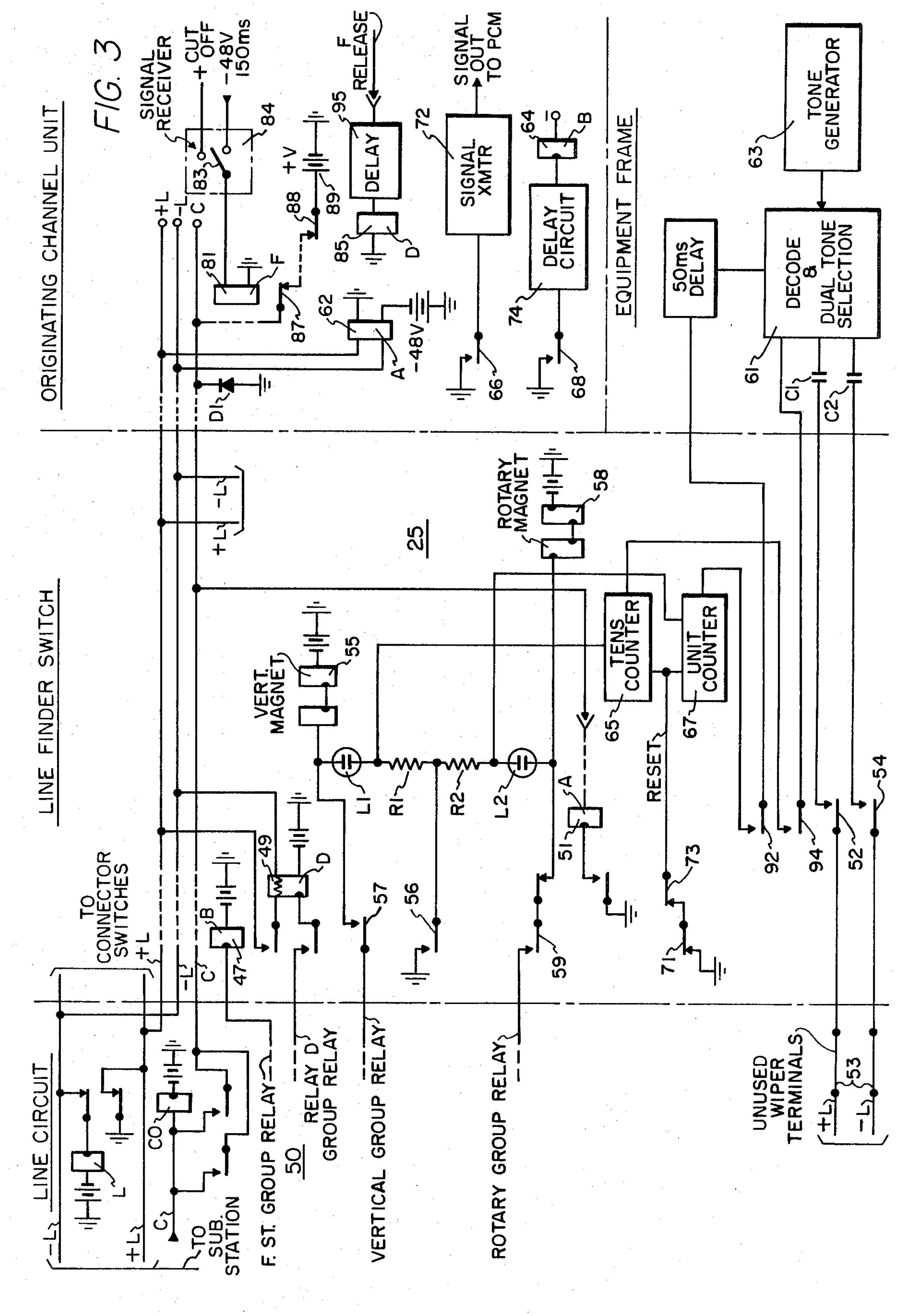
FIG. 3 is a schematic diagram illustrating some modifications to the standard step-by-step equipment and PCM channel bank equipment which provide the telephone exchange of FIG. 1.

FIG. 3 shows the circuit connections necessary for implementing the interconnection of step-by-step telephone exchange equipment with PCM terminal equipment. There is shown at 50 a typical 2-relay line circuit having a line relay L, a cut-off relay CO, lines +L and −L and a control lead C. The operation of this circuit is well described in any number of basic telephony publications and will not be set forth in any significant detail herein. The original line finder group of 200 subscribers associated with group relays A and B (not shown) are divided into two separate groups, i.e., the upper hundred subscriber group and the lower hundred subscriber group. The necessary grading changes are made in the subscriber line connections to the upper and lower banks to eliminate preferential hunting operation of the line finder switches and to provide that each hundred group is assigned to a group relay.

In order to provide for adequate power supply for electronic circuits to be described more fully hereinafter, which circuits are to be added to the functioning of the line finder equipment shelf, end cells are separated as needed from the main battery bank. If no end cells are available, a 6 volt dc power source can be derived from the main battery bank by means of a dc/dc converter (not shown). It should be stated that the removal of end cells as needed from the main battery bank does not result in reducing the capacity of the main power supply to fulfill its remaining power requirements since the overall power consumption has been greatly reduced by eliminating the selector switch stages. Also, it is required to remove booster battery from the connector switches 27 and distribute the same to the originating channel units 31 of the T1 terminal equipment.

The following explanation shall describe proposed modifications to a single line finder switch 25 in order to provide the step-by-step equipment with an automatic number identification ANI feature. It is to be assumed that the lower hundred subscriber group of line finder switches 25 are chosen to serve the 100 group shown at 21 in FIG. 1. Since a line finder switch 25 is known to have a B relay 47, a D relay 49 and an A relay 51 and the sequence of their operation is well known in the art, a minimum amount of explanation of this standard operation will be given in connection with FIG. 3. Now the A relay 51 in FIG. 3 is normally associated with the upper hundred subscriber grouping previously mentioned and is not therefore in use. Hence, its contacts 52 and 54 are available for use to connect the ANI data to the PCM switch through the associated originating channel unit 31. Also, there are available an unused set of wiper cord terminals shown at 53 in FIG. 3 which are used together with the A relay contacts 52 and 54 to send the ANI data to the originating channel unit 31.

As shown in FIG. 3, the associated group relay (not shown) of the line equipment sends a finder start F.ST. signal to a preselected line finder switch 25. The F.ST. signal activates the B relay of the line finder switch as the calling party goes off hook and the line relay L operates. The associated group relay operates a vertical magnet 55 through B relay contacts 57. The vertical magnet 55 lifts the shaft of the step-by-step line finder switch 25 and wipers one step, then opens vertical-interrupter contacts (not shown) for release of the vertical magnet. Upon releasing, the vertical magnet 55 again closes the vertical-interrupter contacts to operate the associated group relay. The cycle is repeated until the vertical wipers are lifted to the rotary level containing the calling line. The vertical wiper then is contacting the marked vertical contact. Now the associated group relay operates a rotary magnet 58 of the line finder switch 25 through B relay contacts 59. The rotary magnet 58 rotates the shaft and wipers one step and opens rotary-interrupter contacts (not shown). The associated group relay is released which releases the rotary magnet 58. Upon releasing, the rotary magnet 58 again closes the rotary interrupter contacts which operates the group relay. This cycle is repeated until the control wipers touch the marked control bank contact. The cut-off relay CO operates and removes the line relay L from across the customer's line.

Upon starting of the line finder switch 25 of FIG. 3, the associated originating channel unit 31 is seized as through the operation of A and B relays 62 and 64 of the OCU 31, respectively. The OCU 31 sends out the off-hook condition (call originating) to the PCM switch network via an assigned channel of the T1 carrier line 37. Within the PCM switch, the recognition of a call origination will cause the selection of a dial pulse DP receiver and a tone responsive receiver for the assigned channel. Next, dial tone is sent from the PCM switch to the calling party. When the A relay 62 operates, its contacts 66 close to complete a circuit to a signal transmitter circuit 72 within the OCU 31 to send SIG OUT to the PCM switch, and its contacts 68 close to supply ground potential to operate the B relay 64 through a standard time delay circuit 74.

Now, in accordance with a scheme to provide the ANI feature in all line finder switches 25, each step-by-step exchange is provided with one decode and dual tone selection circuit 61 per shelf of line finder switches 25 and one touch calling tone generator circuit 63 per exchange. The decode and dual tone selection circuit 61 is a monolithic digital TTL circuit such as a commercial dual 2-line to 4-line decoder/demultiplexer circuit. A pair of neon lamps L1, L2 and a pair of resistors R1, R2 are connected as L1, R1 in series from the vertical magnet to ground potential through a contact 56 of the B relay 47, and L2, R2 in series from the rotary magnet 58 to ground potential through the same contact 56 of the B relay 47. A pair of high speed monolithic decade counter circuits are provided as a 10's counter 65 and a unit counter 67 connected as shown in FIG. 3.

The inputs to the counters 65 and 67 are derived from the neon lamps L1 and L2 of the vertical and rotary magnets 55 and 58, respectively. The identity of a subscriber line is derived from the driving pulses of the vertical and rotary magnets 55 and 58. The counter electromotive force EMF of the magnets are added in series with the main battery 31 48v so that sufficient voltage is produced to fire the neon lamps L1 and L2. As lamp L1 fires, the 10's counter 65 is inputted and as lamp L2 fires, the unit counter 67 is inputted. A reset circuit is provided through series contacts 71 and 73 of the B and D relays, respectively. The pulsing voltage from the neon lamps L1 and L2 can be detected across the resistors R1 and R2 and properly shaped to drive the counters 65 and 67, respectively. The counter digits of the counters 65 and 67 represent the automatic number identification of a calling subscriber in the 100 subscriber group shown at 21 in FIG. 1. The counted digits remain in the counters 65 and 67 until the common control CPU of the PCM switch requests the sending of the ANI data as described more fully hereinafter.

Next, as the calling party detects dial tone DT, according to common practice, either the subscriber dials or uses touch calling to transmit composite frequency tones. When dialing, the A relay 62 follows the dial pulses and the dial pulses are transmitted on to the dial pulse receiver; if touch calling is utilized, the tones are transmitted directly through the voice path +L and −L to the tone responsive receiver of the PCM switch. The PCM now seizes an idle terminating channel unit TCU 33 and its associated connector switch 27 and requests the ANI data. If there are no idle TCU 33 units, the PCM switch provides a busy tone BT to the subscriber; on-hook occurs; the cut-off CO relay releases; D relay 49 releases in the line finder switch 25; A and B relay 62 and 64 of the OCU 31 release; and the on-hook signal is transmitted to the PCM switch which also releases.

The ANI data request from the PCM switch is provided as the answer supervision of the CPU controls a switch contact 83 and causes it to change from a positive potential which is effective to operate an F relay 81 of the OCU 31 through a known signal receiver circuit 84, to a negative (−48 volt) potential effective to turn off the signal receiver circuit 84 and releases the F relay 81. When the F relay 81 releases, one of its break contacts 87 is made and a positive (+50 volt) booster battery 89 is connected through a break contact 88 of a D relay 85 and through the F relay contact 87 to the A relay 51 of the line finder switch 25. The A relay 51 operates and closes make contacts 52, 54, 92, and 94 which interconnect the decode and dual tone selection circuit 61 to the line +L and −L, and also interconnect the counters 65 and 67 to the selection circuit 61, respectively. Hence, the stored digits (ANI data) of the counters 65 and 67 are read out to the PCM switch. There is provided at 95 in FIG. 3, a time delay circuit to insure that after F relay 81 releases, about 150 milliseconds will elapse before the D relay 85 is activated to remove the booster battery 89 from the A relay 51 where upon the A relay releases.

After the ANI data is received by the PCM switch, the dial pulse receiver and tone responsive receivers are released and the subscriber is supplied with normal talking battery. If the ANI is not received by the PCM switch, a busy tone BT is sent to the subscriber and the subscriber goes on- hook; the on-hook signal goes out to the PCM switch; cut-off CO relay releases; D relay 49 of the line finder 25 releases; A and B relay 62 and 64 of the OCU 31 both release; and the PCM switch releases. With the application of normal talking battery, the PCM switch sends the last two digits in the dial pulse or touch calling formats to the seized TCU 33 and the associated connector switch 27. In a well known manner, the connector switch 27 steps in a vertical and rotary pattern to the appropriate subscriber in a group of 100 subscribers. Thereupon, the connector switch 27 applies ring back tone to the calling party and ringing current to the called party.

Finally, as the called party answers, reverse battery is applied by the connector switch 27, the F relay 81 of the OCU 31 releases and the PCM switch meters the duration of the calls where necessary. When the calling and called parties again go on-hook and the CO relay releases, F relay 81 operates, A and B relay 62 and 64 are released, the PCM switch, terminating channel unit 33 and associated connector switch 27 are released. With respect to the ANI read-out sequence, the application of answer supervision by the CPU causes the F relay 81 of the OCU 31 to release whereupon the booster battery +V is applied to the control lead C to operate the A relay 51 of the line finder switch 25. A diode D1 is provided in the OCU 31 in a holding ground connection for the preceding stages. This holding ground connection via the diode D1 will not be affected by the reversed polarity of the booster battery. The operation of the A relay 51 enables the stored ANI digits to be gated out to the PCM switch. The 10's digits are (gated) out first and decoded by the decode circuit 61 for selecting the corresponding dual tones from the analog tone generator 63. The tones are transmitted over the speech path as are the tones for touch calling by the subscriber. After about 50 milliseconds (ms), the 10's digit tones are inhibited. Following a 50 ms silence period, the units digits are read out and decoded for selection of the corresponding dual tones from the tone generator 63. The ANI circuit will be disabled after applying the units digit tones for approximately 50 ms.

The control lead C wire is not necessary for the OCU 31 in this arrangement of a telephone central exchange since no busy/idle test is required to seize the OCU 31. Nevertheless, it is convenient to retain the C lead of the OCU 31 to supply holding ground via the diode D1 for the line circuit and the associated line finder switch 25, as well as for the application of booster battery to initiate transmission of ANI data. Further, the normal −48 volt battery supply on the C lead of the OCU 31 is replaced by +50 volt booster battery supply through a break contact of the F relay 81. The normal D-relay 85 driving circuit has its time constant adjusted to provide that its operating time be greater than 200 ms. This will permit the timing window be sufficient for transmitting the 10's and units digits of ANI. The D-relay 85 has a self-locking feature (not shown) to ensure that the ANI data be read out only once. Alternatively, this feature can be achieved by resetting the ANI counters 65 and 67 following the read out of the units counter 67.

As for modifications to the terminating channel units 33 and connector switches 27, both the TCU 33 and the connectors 27 will function properly without modification with the minor exception of removing the application of booster battery to the OCU's 31. Although there are only two inlet T and R leads available to a connector switch 27, there is no need to provide a 3-wire to 2-wire conversion circuit because a connector 27 is assigned to a specific TCU 33 and no busy/idle test is involved in a seizure function. The modifications to the PCM switch are changes made within the stored program of the common control. In order to properly identify the calling party (the line translation), each T1 line is assigned a number according to office site and the particular hundred group of the calling party. The last two digits (ANI) will be received by a tone responsive receiver from the line finder switch 25 which identifies the calling party number during the search for the originating line. Both a dial pulse receiver and a tone responsive receiver are assigned to each call being placed during the calling party dialing period. If the caller employs touch calling rather than dial pulses, the tone responsive receiver serves to collect the keyed digits as well as to receive the ANI digits. The CPU must provide the reverse +48 volt battery signal to the OCU 31 for about 150 ms as the command for read-out of the ANI data. If ANI is not received, the CPU sends out busy tone BT to the calling party so that the call can be replaced through a different line finder switch 25. In order to complete the connection to the called party, the CPU sends out the last two digits of the called party number in a dial pulse format (as with a suitable dial pulse sender circuit) to drive the seized connector switch 27 to the proper bank contact of the subscriber group.

It is to be understood that while the present invention has been shown and described with reference to a preferred embodiment thereof, the invention is not to be limited to the precise detailed circuit connections and arrangement shown but it is anticipated that various modifications and changes may be made by those skilled in the art of telephony without departing from the spirit and scope thereof.

What is claimed is:

1. An improved telephone communication exchange for linking subscriber lines with a PCM switching system comprising a preselected matrix of subscriber line pairs, line finder switching means operative to connect to an originating one of said subscriber line pairs, originating loop channel unit means directly connected to said line finder switching means for converting analog signals to logic level information, PCM channel means connected to receive said logic level information and including outgoing and incoming time multiplexed carrier mediums, terminating loop channel unit means connected to said PCM channel means for reconverting said logic level information to said analog signals, and connector switching means directly connected to said terminating channel means and operative to electricity connect to a terminating one of said subscriber line pairs for completing a call through said PCM switching system: said line finder switching means includes a vertical stepping magnet assembly, a rotary stepping magnet assembly, first counter circuit means including first voltage firing means for activating said first counter circuit means connected to said vertical magnet assembly, second counter circuit means including second voltage firing means for activating said second counter circuit means connected to said rotary magnet assembly, decode and dual tone selection circuit means connected to receive output signals from said first and second counter circuit means, respectively, for providing output signals to said PCM switching system containing subscriber identification, tone generator means connected to said decode and dual tone selection circuit means for providing predetermined dual tones thereto when said output signals from said first and second counter means are received, and means for selectively connecting the output signals of said first and second counter mean to said decode and dual tone selection circuit means and for selectively connecting the output signals of said selection circuit means to said PCM switching system.

2. An improved telephone communication exchange as claimed in claim 1 wherein said preselected matrix of subscriber line pairs is arranged in a plurality of like groups of subscriber line pairs, said vertical stepping magnet assembly is operative to connect said line finder switching means to a predetermined one of said like groups which includes said originating subscriber line pair and further is operative to provide an output signal to said first voltage firing means for each group to which said line finder switching means is connected, said rotary stepping magnet assembly is operative to connect said line finder switching means to said originating subscriber line pair within said predetermined group of subscriber line pairs of and to provide an output signal to said second voltage firing means for each subscriber line pair to which said line finder switching means is connected within said predetermined group thereof, and the output of said first counter circuit means corresponds to the group identification of said predetermined group and the output of said second counter circuit means corresponds to the subscriber line pair identification of said originating subscriber line pair.

3. An improved telephone communication exchange as claimed in claim 2 wherein said output signal of said second counter circuit means is connected to time delay means prior to being connected to said selection circuit means for providing that the output signal of said first counter circuit means is first received by said selection circuit means.

4. An improved telephone communication exchange as claimed in claim 2 wherein the group identification and the subscriber line pair identification comprises automatic number identification ANI provided to the PCM switching system by said decode and dual tone selection circuit means to control the operation of said connector switching means.

* * * * *

UNITED STATES PATENT OFFICE
CERTIFICATE OF CORRECTION

PATENT NO. 3,863,033

DATED January 28, 1975

INVENTOR(S) CHEN CHUNGMIN/M.J.KELLY/B.J.REKIERE

It is certified that error appears in the above-identified patent and that said Letters Patent are hereby corrected as shown below:

Column 10, lines 4-5, "electricity" should be -- electrically --

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*